United States Patent
Doi

(10) Patent No.: US 7,403,798 B2
(45) Date of Patent: Jul. 22, 2008

(54) WIRELESS BASE SYSTEM, AND DIRECTIVITY CONTROL METHOD

(75) Inventor: Yoshiharu Doi, Gifu (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 399 days.

(21) Appl. No.: 10/471,280

(22) PCT Filed: Aug. 13, 2001

(86) PCT No.: PCT/JP01/06991

§ 371 (c)(1),
(2), (4) Date: Sep. 17, 2003

(87) PCT Pub. No.: WO02/075957

PCT Pub. Date: Sep. 26, 2002

(65) Prior Publication Data

US 2004/0110538 A1   Jun. 10, 2004

(30) Foreign Application Priority Data

Mar. 21, 2001 (JP) .............................. 2001-080423

(51) Int. Cl.
*H04M 1/00* (2006.01)
*H04B 1/06* (2006.01)
*H04B 7/00* (2006.01)

(52) U.S. Cl. .................. 455/561; 455/562.1; 455/272; 455/273; 455/101; 455/137

(58) Field of Classification Search ................ 455/561, 455/562.1, 273, 101, 137, 278.1, 269, 272
See application file for complete search history.

(56) References Cited

U.S. PATENT DOCUMENTS 5,752,173 A * 5/1998 Tsujimoto .................... 455/137
6,061,553 A * 5/2000 Matsuoka et al. ........... 455/273
6,347,234 B1 * 2/2002 Scherzer .................. 455/562.1

(Continued)

FOREIGN PATENT DOCUMENTS

EP         0 984 507 A2    3/2000

(Continued)

OTHER PUBLICATIONS

Nobuyoshi Kikuma, Kagaku Gijutsu Shuppan, pp. 35-49, Nov. 1998, "*Adaptive Signal Processing by Array Antenna*" together with Partial English Translation.

(Continued)

*Primary Examiner*—Matthew Anderson
*Assistant Examiner*—Wen W Huang
(74) *Attorney, Agent, or Firm*—Westerman, Hattori, Daniels & Adrian, LLP.

(57) ABSTRACT

Antennas in an entire radio base station system are divided into two antenna groups so that each group has antennas in the number that allows convergence of reception directivity using a reference signal length. Reception weight vector calculators (112, 212) corresponding to respective antenna groups perform adaptive array processings, and corresponding array outputs are provided to a maximum ratio combining circuit (18). The maximum ratio combining circuit (18) performs maximum ratio combining of the array outputs corresponding to two antenna groups, based on weight information output from the reception weight vector calculators (112, 212).

12 Claims, 5 Drawing Sheets

U.S. PATENT DOCUMENTS

| | | | |
|---|---|---|---|
| 6,624,784 B1 * | 9/2003 | Yamaguchi | 342/378 |
| 6,665,286 B1 * | 12/2003 | Maruta et al. | 455/276.1 |
| 6,714,584 B1 * | 3/2004 | Ishii et al. | 455/273 |
| 6,771,988 B2 * | 8/2004 | Matsuoka et al. | 455/562.1 |

FOREIGN PATENT DOCUMENTS

| | | |
|---|---|---|
| EP | 1 014 485 A1 | 6/2000 |
| EP | 1 041 670 A2 | 10/2000 |
| JP | 2000-082982 | 3/2000 |
| JP | 2000-201012 | 7/2000 |
| WO | WO 00/26988 | 5/2000 |

OTHER PUBLICATIONS

Hiroshi Suzuki, et al. IEICE Transactions, B-II, vol. J76-B-II, No. 4, pp. 189-201, Apr. 1993, *"Dynamic Performance Analysis on RLS Adaptive Equalizers for Mobile Radio Transmission"* with Partial English Translation.

\* cited by examiner

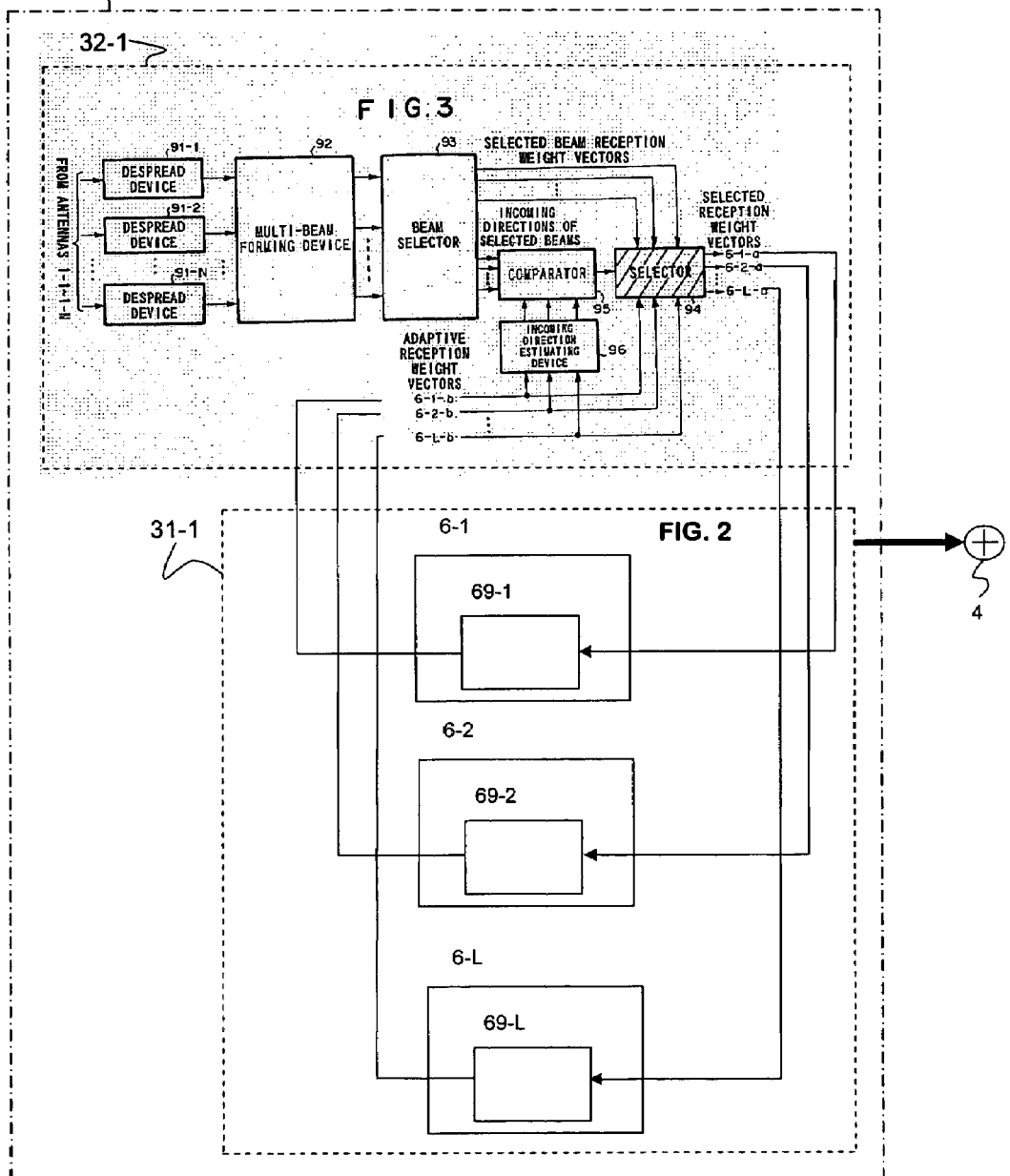

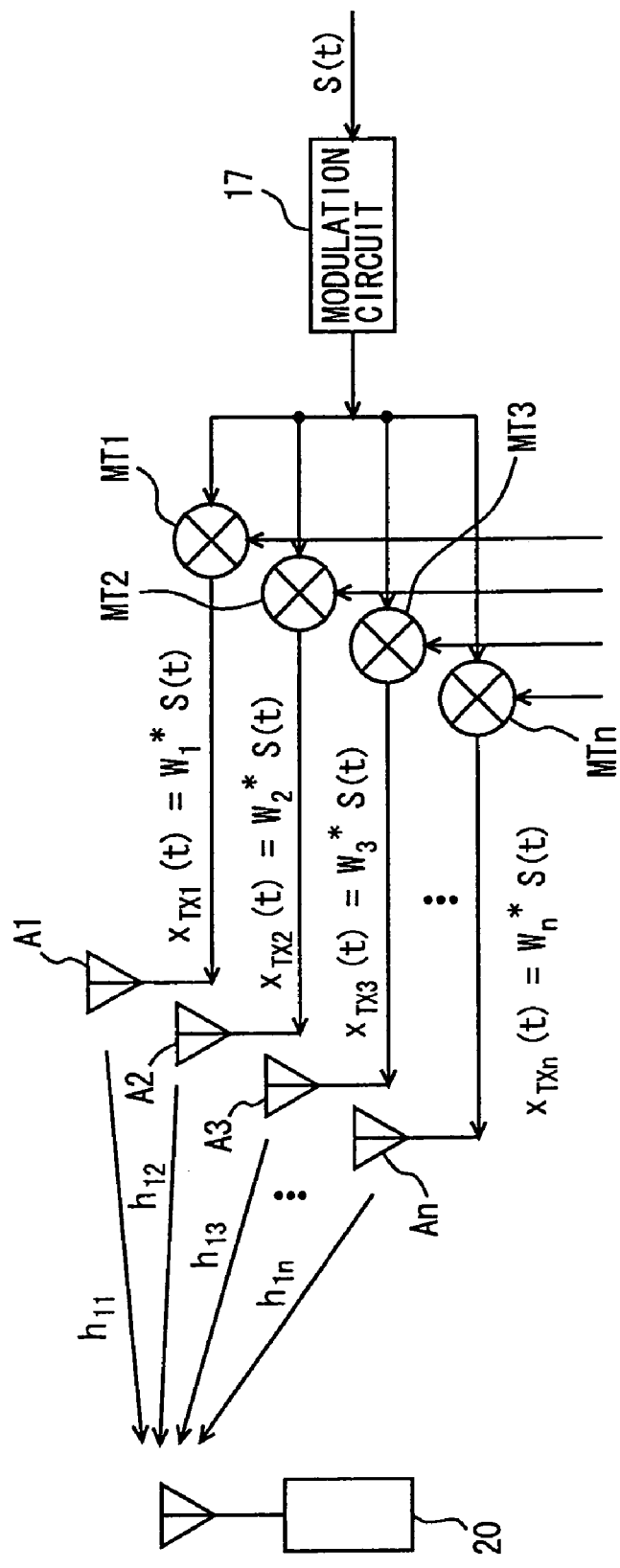
F I G. 4

DIRECTION OF TERMINAL

DIRECTION OF TERMINAL

WIRELESS BASE SYSTEM, AND DIRECTIVITY CONTROL METHOD

TECHNICAL FIELD

The present invention relates to a radio base station system and a method of controlling directivity, and more particularly, to a radio base station system extracting a reception signal from a specific mobile terminal with an adaptive array processing in a mobile communication system, as well as to a method of controlling reception directivity in such a radio base station system.

BACKGROUND ART

Recently, in a rapidly-developing mobile communication system (for example, Personal Handyphone System: hereinafter, referred to as "PHS"), a method of extracting a reception signal from a desired, specific mobile terminal with an adaptive array processing in a radio base station system in communication between a radio base station system and a mobile terminal has been proposed.

In the adaptive array processing, based on a reception signal from a mobile terminal, a weight vector consisting of reception coefficients (weights) for respective antennas in the radio base station system is calculated to perform adaptive control. Thus, a signal from a specific mobile terminal is accurately extracted.

In the radio base station system, a reception weight vector calculator calculating such a weight vector for each symbol of the reception signal is provided. The reception weight vector calculator performs a processing to converge the weight vector so as to reduce a mean square error between the sum of complex multiplication of the reception signal by a calculated weight vector and a known reference signal, that is, the adaptive array processing to converge reception directivity from a specific mobile terminal.

In the adaptive array processing, such a weight vector is adaptively converged in accordance with time and fluctuation of a property of a propagation path for a signal radio wave. In addition, an interfering component or noise is eliminated from the reception signal, to extract the reception signal from the specific mobile terminal.

FIG. 6 is a functional block diagram functionally illustrating a conventional adaptive array processing performed with software by a digital signal processor (DSP) of the radio base station system.

Referring to FIG. 6, reception signals forming a reception signal vector from a mobile terminal, respectively received at a plurality of antennas in the radio base station system, for example, n antennas A1, A2, . . . , An, are switched to a reception circuit side by switching circuits S1, S2, . . . , Sn, and converted to digital signals by not-shown A/D converters respectively.

These digital signals are provided to a not-shown DSP in the radio base station system, and are subjected to adaptive array processing with software later, as in the functional block diagram shown in FIG. 6.

Referring to FIG. 6, the reception signals switched to the reception circuit side by switching circuits S1, S2, . . . , Sn are provided to one inputs of multipliers MR1, MR2, . . . , MRn respectively as well as to a reception weight vector calculator 12.

Reception weight vector calculator 12 calculates a weight vector consisting of weights for respective antennas with adaptive array algorithm described later, and provides the weights to the other inputs of multipliers MR1, MR2, . . . , MRn respectively. Then, the weights are subjected to complex multiplication by the reception signals from corresponding antennas. An adder 10 will provide an array output signal, which is the sum of complex multiplication results.

The result of the sum of complex multiplication as described above is once demodulated to bit data by a demodulation circuit 11. Thereafter, the result is supplied as the array output signal, and remodulated by a remodulation circuit 14.

A known reference signal d(t) stored in a memory 15 in advance is provided to reception weight vector calculator 12 by a switching circuit 13 during a reference signal period defined by a count value of a counter 16, and used for calculation of the weight vector with the adaptive array algorithm. The reference signal d(t) is the known signal common to all users; contained in the reception signal from the mobile terminal. For example, in the PHS, sections in the reception signal, that is, a preamble (PR) and a unique word (UW) constituted with a known bit train, are used.

On the other hand, when an end of the reference signal period is detected with the count value of counter 16, the array output signal remodulated by remodulation circuit 14 is provided to reception weight vector calculator 12 by switching circuit 13, and used for calculation of the weight vector with the adaptive array algorithm.

Reception weight vector calculator 12 uses the adaptive array algorithm such as RLS (Recursive Least Squares) algorithm or SMI (Sample Matrix Inversion) algorithm.

Such RLS algorithm and SMI algorithm are well-known techniques in the field of adaptive array processing, and described in detail, for example, in Nobuyoshi Kikuma, "Adaptive Signal Processing with Array Antenna", Science Press, Inc., p.35-p.49, chapter 3, "MMSE Adaptive Array". Therefore, description thereof will not be provided.

In addition, a transmission signal from a not-shown transmission signal source is modulated by a modulation circuit 17, and provided to one input terminals of respective multipliers MT1, MT2, . . . , MTn. The weights calculated in reception weight vector calculator 12 is copied and applied to the other input terminals of respective multipliers MT1, MT2, . . . , MTn.

As described above, the transmission signals weighted by complex multiplication by the weight vector are selected in switching circuits S1, S2, . . . , Sn, and transmitted through antennas A1, A2 . . . , An.

Signals transmitted through the same antennas A1, A2 . . . , An as in reception are weighted by the weight vector targeted for the specific mobile terminal as with the reception signal. Therefore, radio wave signals transmitted from these antennas are emitted with transmission directivity targeted for the specific mobile terminal.

Meanwhile, in the conventional radio base station system in FIG. 6, signals are communicated using n antennas. As the number of antennas increases, interference that can be suppressed through the adaptive array processing increases. Furthermore, antenna gain becomes larger, and coverage of a transmission radio wave is expanded. In other words, as the number of antennas increases, performance of the adaptive array processing will improve.

With regard to the adaptive array algorithm such as RLS and SMI as described above, however, in order to converge the weight vector, that is, to converge reception directivity from the specific mobile terminal, a reference signal of a signal length (the number of symbols) not smaller than twice the number of antennas is required. In other words, when the signal length of the reference signal is predetermined, and if there are antennas more than half the signal length, the weight vector does not converge, nor does the reception directivity.

For example, in the PHS standard, the reference signal consisting of the aforementioned preamble and unique word includes 12 symbols. In other words, the signal length is 12. Therefore, the weight vector can converge, if up to 6 antennas, which is half of signal length 12, at the maximum are used. When more than 6 antennas are used, however, the weight vector can no longer sufficiently converge.

The reason why the number of antennas that allows convergence of reception directivity is restricted by the signal length of the reference signal is well-known in the field of adaptive array processing, as described in detail, for example, in Hiroshi Suzuki et al., "Dynamic Performance Analysis on RLS Adaptive Equalizers for Mobile Radio Transmission", IEICE Trans, B-II, Vol. J76-B-II, No.4, p.189-p.201, April 1993. Therefore, description thereof will not be provided.

As described above, in order to basically enhance the performance of the adaptive array processing (to achieve wider coverage), the number of antennas should be increased. For that purpose, the signal length of the reference signal should be made longer due to the restriction of the adaptive array algorithm described above. On the other hand, in the PHS standard, for example, an amount of information for 1 frame of a transmission signal consisting of the reference signal and a data signal is determined as 120 bits. If the reference signal length is extended, an amount of user data that can be transmitted will decrease, and data throughput will be lowered.

Therefore, an object of the present invention is to provide a radio base station system which can perform adaptive array processing with a larger number of antennas, using a reference signal of a limited signal length.

Another object of the present invention is to provide a method of controlling directivity, with which reception directivity in a radio base station system can be converged, using a reference signal of a limited signal length.

Yet another object of the present invention is to provide a radio base station system as well as a method of controlling directivity, which can increase antenna gain to expand a coverage of a transmission radio wave, using a reference signal of a limited signal length.

DISCLOSURE OF THE INVENTION

The present invention provides a radio base station system communicating signals with a plurality of mobile terminals using a plurality of antennas. The signals are divided into signal sections including a known reference signal of a first signal length and a data signal of a second signal length. The plurality of antennas are divided into a plurality of antenna groups, each including antennas in a number that allows convergence of reception directivity using the known reference signal of the first signal length. The radio base station system includes a plurality of adaptive array processing portions and a reception signal generating portion. The plurality of adaptive array processing portions are provided corresponding to the plurality of antenna groups respectively, and each of them performs a prescribed adaptive array processing to signals received at corresponding antenna group, to extract an array output signal corresponding to a specific mobile terminal among the plurality of mobile terminals, and generates weight information based on accuracy of the adaptive array processing. The reception signal generating portion generates a reception signal from the specific mobile terminal, based on a plurality of array output signals corresponding to the specific mobile terminal and a plurality of pieces of the weight information supplied from the plurality of adaptive array processing portions.

Preferably, the reception signal generating portion includes a maximum ratio combining portion generating the reception signal from the specific mobile terminal by performing maximum ratio combining of the plurality of array output signals corresponding to the specific mobile terminal and the plurality of pieces of the weight information.

Preferably, the reception signal generating portion includes a select portion comparing the plurality of pieces of the weight information, selecting any one of the plurality of array output signals based on that result, and outputting the signal as the reception signal from the specific mobile terminal.

Preferably, the weight information is based on a mean square error between the array output calculated by each adaptive array processing portion and the reference signal.

Preferably, the radio base station system further includes a directivity convergence portion converging transmission directivity of a transmission signal to the specific mobile terminal, based on results of adaptive array processings by the plurality of adaptive array processing portions.

Preferably, the number of antennas that allows convergence of reception directivity is not larger than half the first signal length of the reference signal.

According to another aspect of the present invention, a method of controlling directivity in a radio base station system communicating signals with a plurality of mobile terminals using a plurality of antennas is provided. The signals are divided into signal sections including a known reference signal of a first signal length and a data signal of a second signal length. The method of controlling directivity includes the steps of: dividing the plurality of antennas into a plurality of antenna groups, each including antennas in a number that allows convergence of reception directivity using the known reference signal of the first signal length; performing a prescribed adaptive array processing to signals received at corresponding antenna group for each of the plurality of antenna groups, to extract an array output signal corresponding to a specific mobile terminal among the plurality of mobile terminals, and generating weight information based on accuracy of the adaptive array processing; and generating a reception signal from the specific mobile terminal, based on a plurality of array output signals corresponding to the specific mobile terminal and a plurality of pieces of weight information.

Preferably, the step of generating the reception signal includes the step of generating the reception signal from the specific mobile terminal by performing maximum ratio combining of the plurality of the array output signals corresponding to the specific mobile terminal and the plurality of pieces of weight information.

Preferably, the step of generating the reception signal includes the step of comparing the plurality of pieces of weight information, selecting any one of the plurality of array output signals based on that result, and outputting the signal as the reception signal from the specific mobile terminal.

Preferably, the weight information is based on a mean square error between the array output calculated through the prescribed adaptive array processing and the reference signal.

Preferably, the method of controlling directivity further includes the step of converging transmission directivity of a transmission signal to the specific mobile terminal, based on results of the adaptive array processings.

Preferably, the number of antennas that allows convergence of reception directivity is not larger than half the first signal length of the reference signal.

Therefore, according to the present invention, antennas in the entire radio base station system are divided into a plurality of antenna groups so that each group has antennas in the number that allows convergence of reception directivity using the signal length of the known reference signal. In addition, the array output signal obtained by performing adaptive array processing for each of the plurality of antenna groups is processed in accordance with the weight information based on accuracy of the adaptive array processing for each of the plurality of antenna groups so that the reception signal from the specific mobile terminal is generated. Therefore, the adaptive array processing using larger number of antennas is achieved without increasing the signal length of the known reference signal itself. Thus, antenna gain is enhanced, and coverage of the transmission radio wave is expanded, without lowering data throughput.

BRIEF DESCRIPTION OF THE DRAWINGS

FIG. 3 is a flowchart showing the adaptive array processing of the radio base station system according to the second embodiment of the present invention shown in FIG. 2.

BEST MODES FOR CARRYING OUT THE INVENTION

Figure 1:
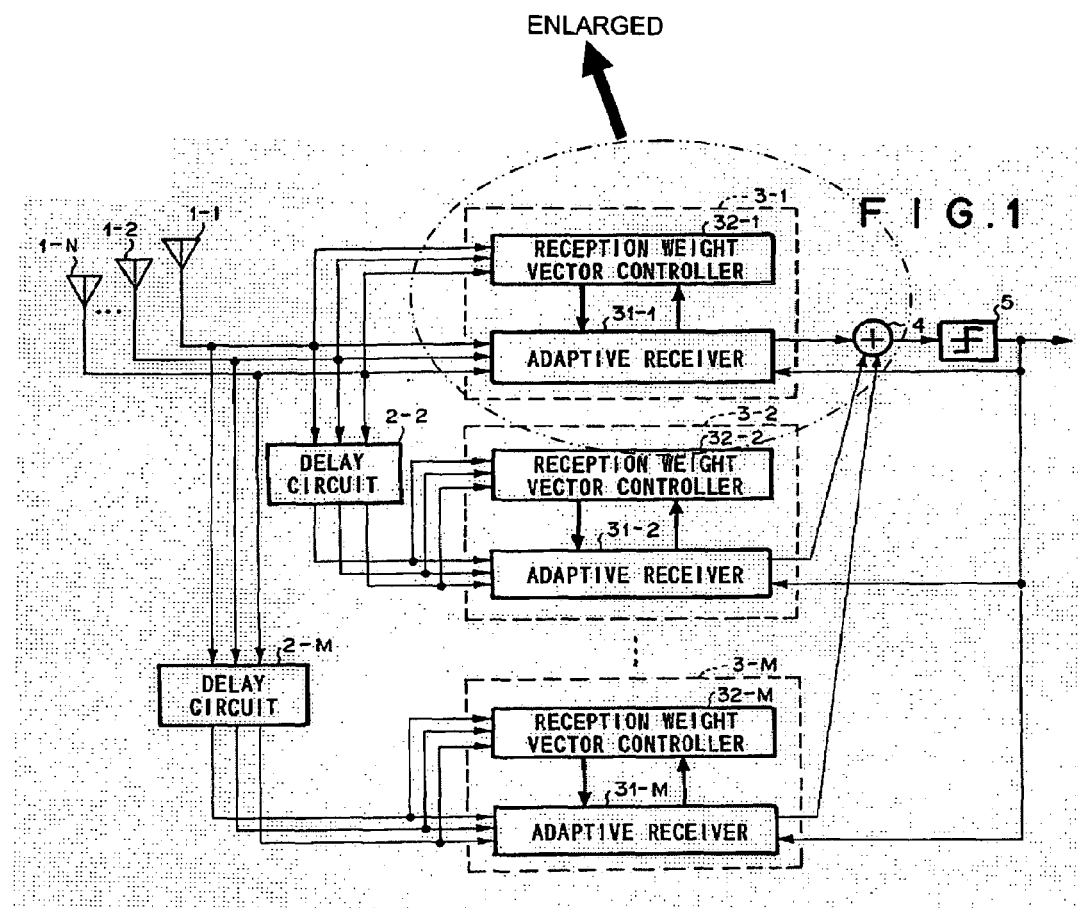
FIG. 1 is a functional block diagram functionally illustrating an adaptive array processing performed with software by a radio base station system in a first embodiment of the present invention.

In the following, embodiments of the present invention will be described in detail with reference to the figures. It is noted that the same reference characters refer to the same or corresponding components in the figures.

FIRST EMBODIMENT

FIG. 1 is a functional block diagram functionally illustrating the adaptive array processing performed with software by the radio base station system in the first embodiment of the present invention. A configuration shown in FIG. 1 is the same as that in the conventional example shown in FIG. 6, except for the following points. Therefore, description for components common to both examples will not be repeated.

Figure 6:
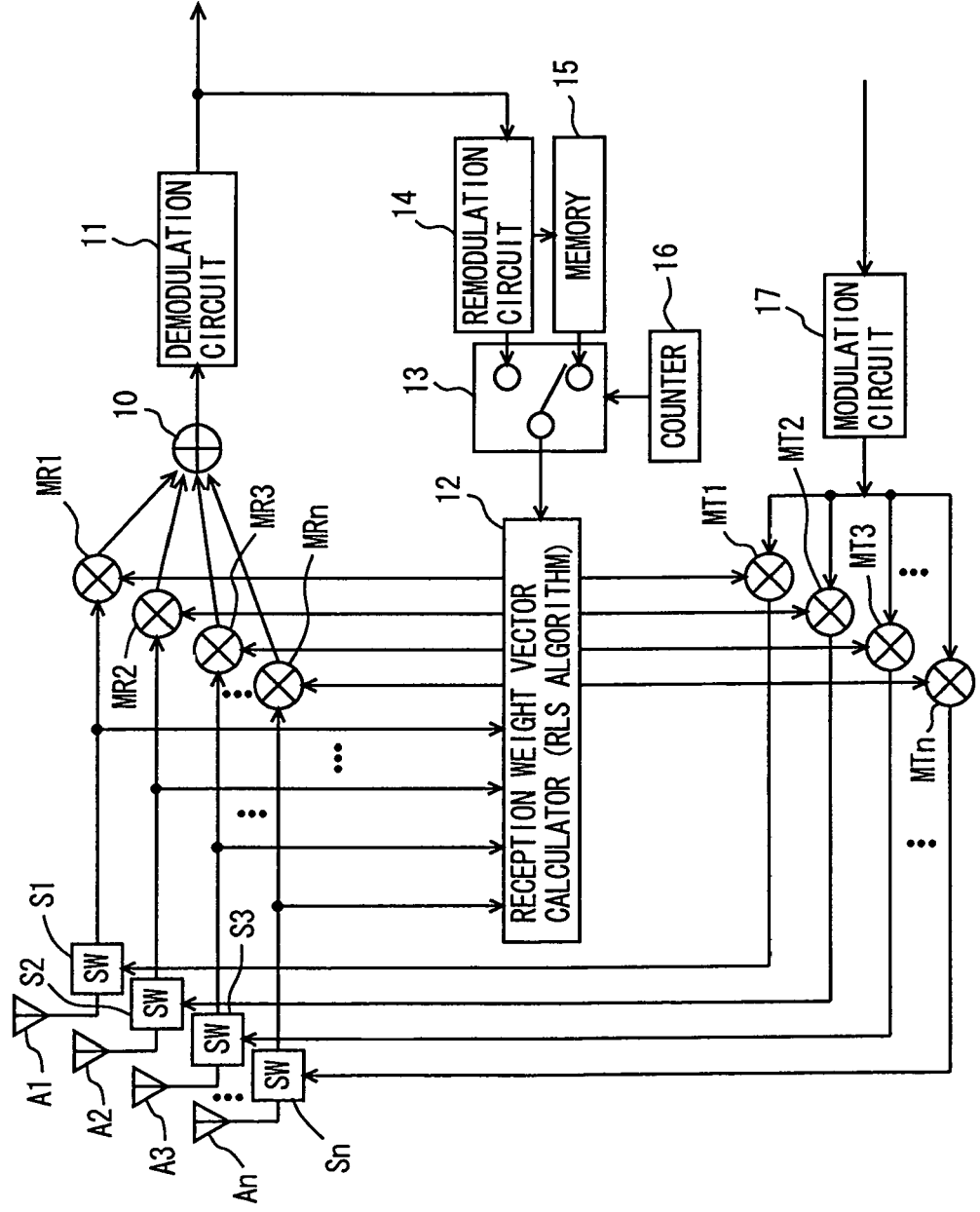
FIG. 6 is a functional block diagram functionally illustrating an adaptive array processing performed with software by a conventional radio base station system.
Figure 1:
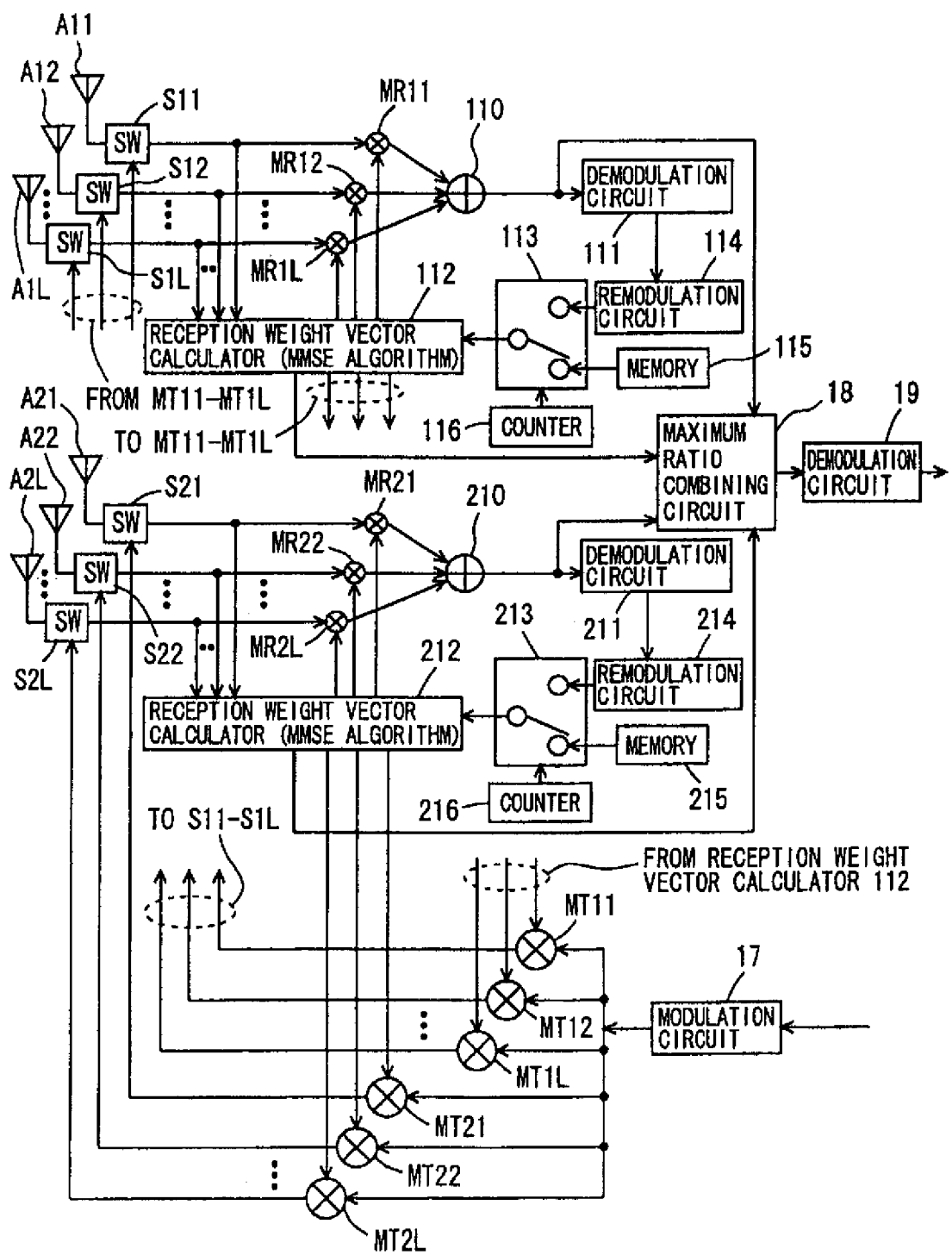

In the configuration shown in FIG. 1, all antennas (2L: L is a positive integer) in the radio base station system are divided into two antenna groups (A11, A12, . . . A1L) and (A21, A22, . . . , A2L), each consisting of L antennas. Here, L is the number that allows convergence of reception directivity using a prescribed signal length of the known reference signal (for example, aforementioned PR and UW in the PHS) contained in the reception signal from the mobile terminal. The adaptive array processing shown in the functional block diagram of FIG. 6 is performed for each antenna group. The adaptive array processing for each antenna group has been described with reference to FIG. 6, and description thereof will not be repeated here.

Note that reception weight vector calculators 112 and 212 in the first embodiment of FIG. 1 are for calculating a weight vector using MMSE (Minimum Mean Square Error) algorithm such as aforementioned RLS, SMI or the like.

In the first embodiment shown in FIG. 1, the sum of complex multiplication of signals received at one antenna group A11, A12, . . . , A1L by the weight vector calculated by reception weight vector calculator 112 is provided to maximum ratio combining circuit 18. In addition, the weight information described later, calculated by reception weight vector calculator 112, is also provided to maximum ratio combining circuit 18. Unlike the conventional radio base station system in FIG. 6, an output of a demodulation circuit 111 is not directly supplied to the outside.

Moreover, the sum of complex multiplication of signals received at the other antenna group A21, A22, . . . , A2L by the weight vector calculated by reception weight vector calculator 212 is provided to maximum ratio combining circuit 18. In addition, the weight information calculated by reception weight vector calculator 212 is also provided to maximum ratio combining circuit 18. Unlike the conventional radio base station system in FIG. 6, an output of a demodulation circuit 211 is not directly supplied to the outside.

Maximum ratio combining circuit 18 performs maximum ratio combining of the array output signals from the specific mobile terminal, provided from adders 110 and 210 respectively, based on the weight information provided from reception weight vector calculators 112 and 212 respectively. Moreover, maximum ratio combining circuit 18 generates a reception signal from the aforementioned specific mobile terminal, and provides the signal to demodulation circuit 19. Demodulation circuit 19 demodulates the provided reception signal to bit data, and supplies the data to the outside.

In the following, an operation of maximum ratio combining circuit 18 will be described in detail.

In the radio base station system in the first embodiment of FIG. 1, signals received by one antenna group A11, A12, . . . , A1L are represented as $x_{11}(t), \ldots, x_{1L}(t)$, and the weights corresponding to respective antennas, calculated in reception weight vector calculator 112, are represented as $w_{11}, \ldots, w_{1L}$. Then, an array output signal y1(t) corresponding to one antenna group, output from adder 110, is expressed in the following equation.

$$y1(t) = w_{11}x_{11}(t) + \ldots + w_{1L}x_{1L}(t)$$

Here, when the reference signal is represented as d(t), a mean square error MSE1 calculated in reception weight vector calculator 112 is expressed in the following equation.

$$MSE1 = (d(t) - y1(t))^2$$

Next, signals received by the other antenna group A21, A22, . . . , A2L are represented as $x_{21}(t), \ldots, x_{2L}(t)$, and the weights corresponding to respective antennas, calculated in reception weight vector calculator 212, are represented as $w_{21}, \ldots, w_{2L}$. Then, an array output signal y2(t) corresponding to the other antenna group, output from adder 210, is expressed in the following equation.

$$y2(t) = w_{21}x_{21}(t) + \ldots + w_{2L}x_{2L}(t)$$

Here, a mean square error MSE2 calculated by reception weight vector calculator 212 is expressed in the following equation.

$$MSE2 = (d(t) - y2(t))^2$$

Here, physically, each of MSE1 and MSE2 indicates a signal component other than a desired wave, included in a corresponding array output signal y1(t), y2(t) obtained as a result of the adaptive array processing of the corresponding antenna group, that is, power of remaining interfering wave and a noise signal.

The weight information provided to maximum ratio combining circuit 18 respectively from reception weight vector calculators 112 and 212 are reciprocal of the mean square errors calculated in the respective reception weight vector calculators, that is, 1/MSE1, 1/MSE2.

Maximum ratio combining circuit 18 receives array output signals y1(t), y2(t) and weight information 1/MSE1, 1/MSE2, and generates a reception signal MRC(t) from the specific mobile terminal, based on a maximum ratio combining equation below.

$$MRC(t)=y1(t)/MSE1+y2(t)/MSE2$$

Here, a desired wave from the specific mobile terminal included in the adaptive array output signal is represented as S(t), and signal components other than that is tentatively represented as noise signals n1(t), n2(t). Then, respective adaptive array output signals are expressed as follows.

$$y1(t)=S(t)+n1(t)$$

$$y2(t)=S(t)+n2(t)$$

In addition, during the reference signal period, signal component S(t) of the desired wave is equal to reference signal d(t). Mean square error MSE calculated in respective reception weight vector calculator is expressed as follows.

$$MSE1=|n1(t)|^2$$

$$MSE2=|n2(t)|^2$$

When these array output signals y1(t), y2(t) and mean square errors MSE1, MSE2 are substituted in the above maximum ratio combining equations to find reception signal MRC (t), following equation (a) is obtained.

$$MRC(t)=(1/|n1(t)|^2+1/|n2(t)|^2)S(t)+n1(t)/|n1(t)|^2+n2(t)/|n2(t)|^2 \quad (a)$$

Next, the reason why signal to noise ratio SNR of the generated reception signal is improved by the above maximum ratio combining calculation with maximum ratio combining circuit 18 will be described.

For example, when a relation of $MSE1=|n1(t)|^2=0.1$ is assumed, SNR of array output signal y1(t) is as follows.

$$SNR \text{ of } y1(t)=10\log(10)=10 \; dB$$

On the other hand, when a relation of $MSE2=|n2(t)|^2=0.2$ is assumed, SNR of array output signal y2(t) is obtained as follows.

$$SNR \text{ of } y2(t)=10\log(5)=7 \; dB$$

As can be understood from the equation (a) for the above maximum ratio combining calculation, in combining maximum ratio, amplitudes are combined with regard to signal component S(t) of the desired wave, while powers are combined with regard to noise signals n1(t), n2(t).

When these specific figures are substituted in the above equation (a), the power of signal component S(t) will attain 15*15=225. On the other hand, the power of the noise component is calculated in the following manner.

$$(10*sqrt(0.1))^2+(5*sqrt(0.2))^2=100*0.1+25*0.2=15$$

Therefore, SNR of signal MRC that has been subjected to maximum ratio combining is calculated in the following manner.

$$10\log(225/15)=10\log(15)=11.8 \; dB$$

Thus, it is understood that SNR of the signal that has been subjected to maximum ratio combining is better, compared with the value for MSE described above.

It is to be noted that MSE calculated in each of reception weight vector calculators 112 and 212 may be a value averaged by a specific time T in an appropriate frame of the reception signal. Here, MSE1 and MSE2 are expressed in the following equations $$MSE1=\Sigma(d(t)-y1(t))^2/T$$

$$MSE2=\Sigma(d(t)-y2(t))^2/T$$

As described above, in the first embodiment of the present invention, all antennas (2L) in the radio base station system are divided into the antenna groups including antennas in the number (L) that allows convergence of the weight vector using a reference signal length. Then, the adaptive array processings are performed for respective antenna groups, and the resulted array output signals are subjected to maximum ratio combining, using the weight information reflecting accuracy of the adaptive array processings (for example, the reciprocal of the mean square error between the reference signal and the array output signal). Therefore, reception directivity can converge in all antennas using the limited reference signal length.

In addition, even if all antennas are divided into two antenna groups in this manner, the reception signal from the specific mobile terminal can be generated with high accuracy, by performing maximum ratio combining of the two array outputs, taking into account the weight information of the adaptive array processings.

SECOND EMBODIMENT

Figure 2:
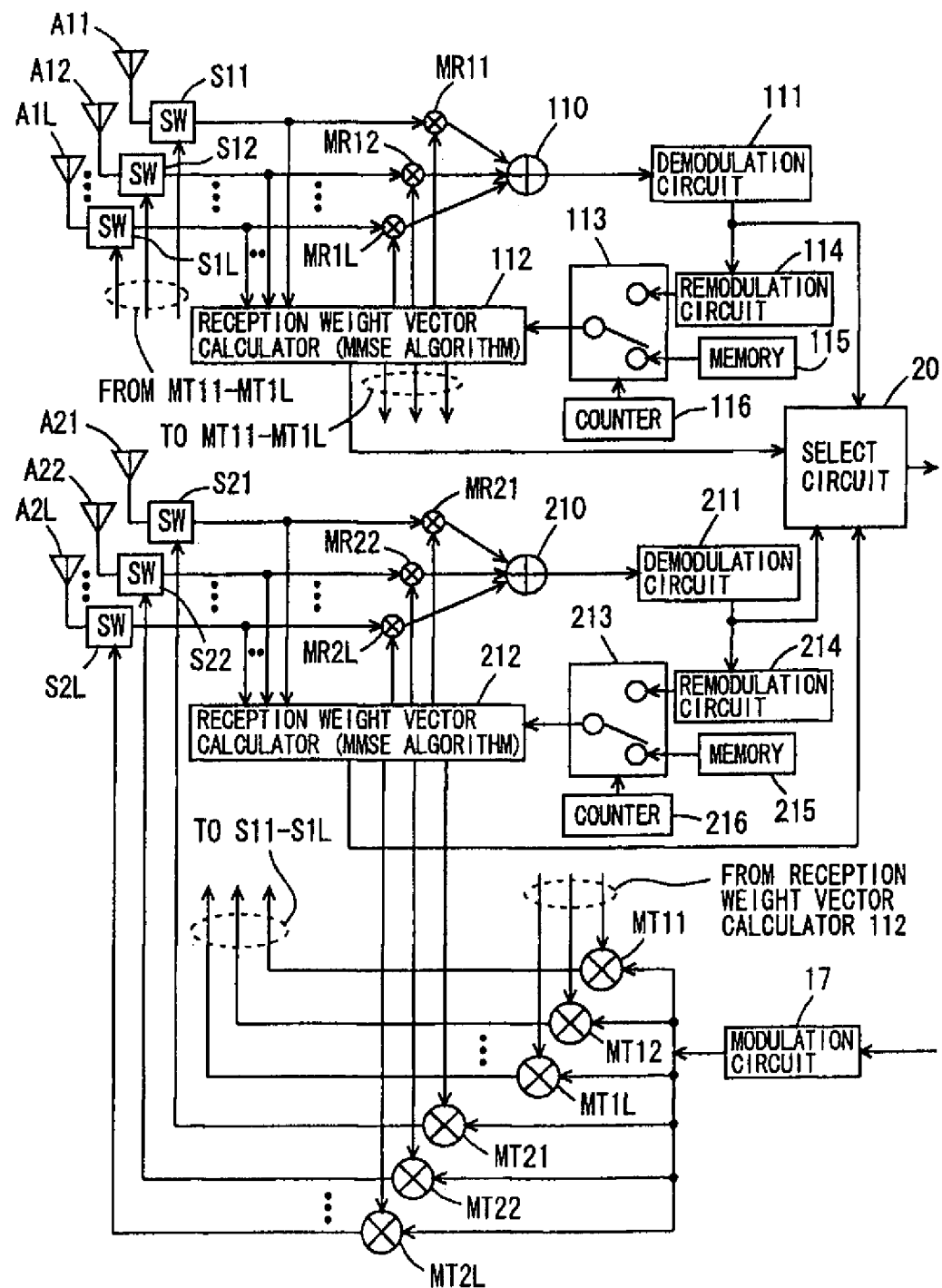
FIG. 2 is a functional block diagram functionally illustrating an adaptive array processing performed with software by a radio base station system in a second embodiment of the present invention.

FIG. 2 is a functional block diagram functionally illustrating the adaptive array processing performed with software by a radio base station system in the second embodiment of the present invention. A configuration shown in FIG. 2 is the same as that in the first embodiment shown in FIG. 1, except for the following points. Therefore, description for components common to both embodiments will not be repeated.

In the configuration shown in FIG. 2, a select circuit 20 is provided instead of maximum ratio combining circuit 18 and demodulation circuit 19 in the first embodiment of FIG. 1.

In the configuration of the first embodiment in FIG. 1, the array output signals before demodulation to bit data, corresponding to respective antenna groups, are combined in the maximum ratio combining circuit, and the generated output is demodulated to bit data by demodulation circuit 19. In the configuration of the second embodiment of FIG. 2, however, the demodulated bit data of the array outputs corresponding to respective antenna groups are provided to select circuit 20.

As in the first embodiment of FIG. 1, the weight information, that is, 1/MSE1, 1/MSE2, are given to select circuit 20 from reception weight vector calculators 112 and 212 respectively.

FIG. 3 is a flowchart illustrating an operation of select circuit 20 implemented in DSP. Referring to FIG. 3, the operation of select circuit 20 in FIG. 2 will be described below.

First, the weight vectors are calculated in reception weight vector calculators 112, 212 respectively, and array outputs y(t) and weight information 1/MSE corresponding to respective antenna groups are output to select circuit 20 (step S1).

Then, select circuit 20 selects an array output signal corresponding to an antenna group having larger weight information (that is, having smaller mean square error MSE), and outputs the signal to the outside as the reception signal from the specific mobile terminal (step S2).

Select circuit 20 in the second embodiment does not combine the array output signals from respective antenna groups, but selects one array output having higher reliability out of the array outputs, based on the weight information. Therefore, in the second embodiment, the adaptive array processing can be simplified.

In the first and second embodiments described above, examples in which all antennas in the radio base station system are divided into two antenna groups have been described. The present invention, however, is not limited to such 2-part division as described above. The present invention can be implemented by dividing the antennas into a plurality of antenna groups in accordance with the number of antennas, so long as reception directivity can be converged using the reference signal length in each antenna group.

Figure 5A:
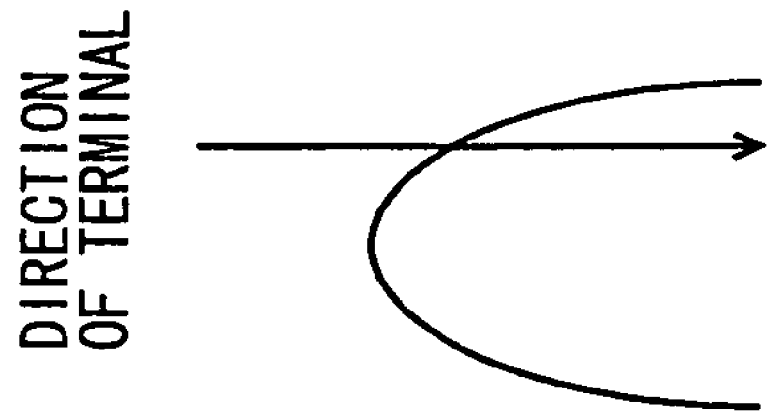
FIGS. 5A and 5B are schematic diagrams of transmission directivity illustrating the effect of the present invention.
Figure 5B:
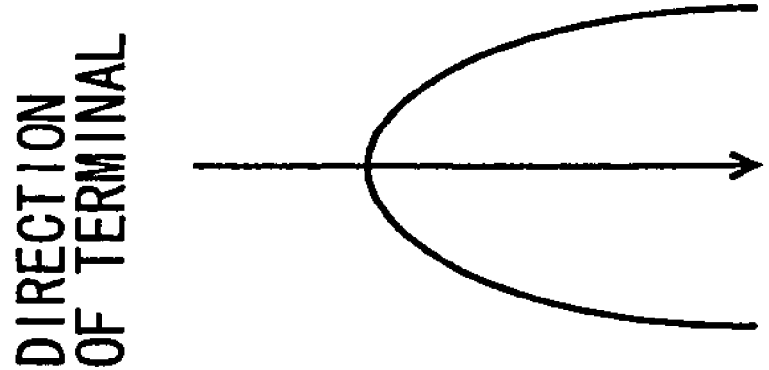
Figure 4:
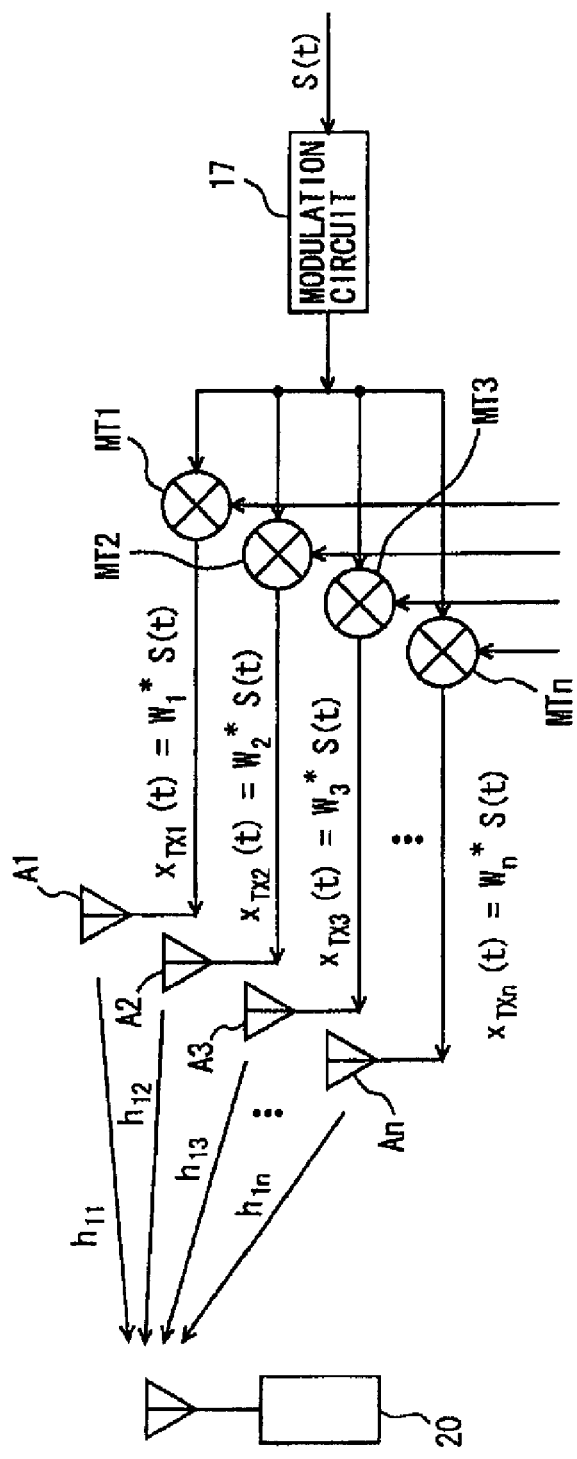
FIG. 4 is a functional block diagram of a transmission system, illustrating an effect of the present invention.
Figure 5A:
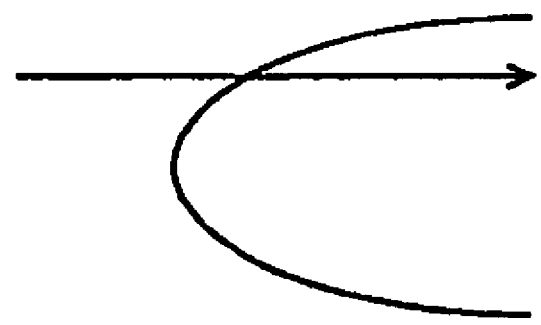
Figure 5B:
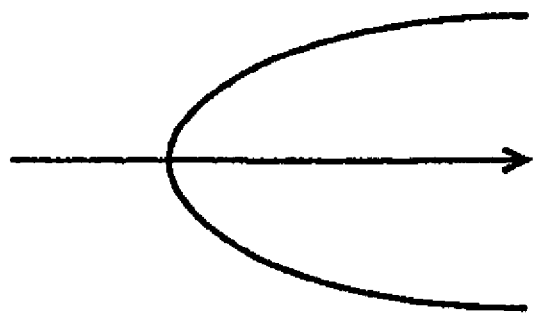
Figure 6:
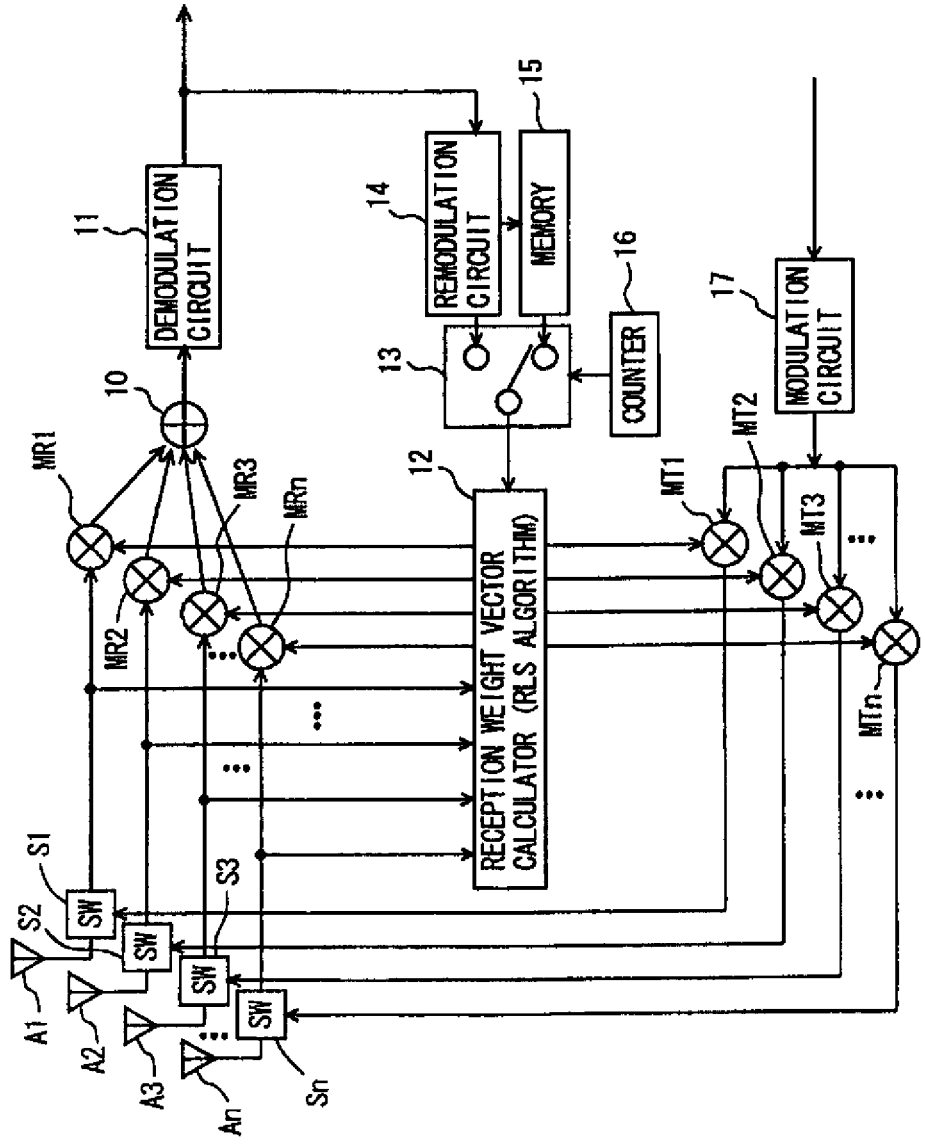

Next, FIG. 4 is a partial functional block diagram illustrating an effect of the embodiment of the present invention, while FIGS. 5A and 5B are schematic diagrams of transmission directivity. In the following, referring to FIGS. 4, 5A and 5B, a principle will specifically be described, with which sufficient array gain can be obtained, and transmission directivity from the radio base station system to the mobile terminal and radio wave coverage are improved, when an ideal weight vector can be calculated with the present invention even if the number of antennas increases.

FIG. 4 is a functional block diagram showing a function of a transmission system of the radio base station system which can achieve convergence of the weight vector in all antennas (n). After modulated in modulation circuit 17, a transmission signal S(t) is provided to one inputs of respective multipliers MT1, MT2, ..., MTn in the transmission system. The weight vector targeted for the specific mobile terminal, calculated in the reception weight vector calculator, is copied and applied to these multipliers. From respective multipliers, signals represented by the following equations (1) to (4) are output, and provided to antennas A1, A2, ..., An.

$$x_{TX1}(t) = w_1 * s(t) \quad (1)$$

$$x_{TX2}(t) = w_2 * s(t) \quad (2)$$

$$x_{TX3}(t) = w_3 * s(t) \quad (3)$$

$$x_{TXn}(t) = w_n * s(t) \quad (4)$$

A down transmission signal from the radio base station system to a specific mobile terminal 20 is received by mobile terminal 20. When the reception signal vector is represented as $h_{11}, h_{12}, \ldots, h_{1n}$, reception signal y(t) at mobile terminal 20 will be expressed with the following equation (5).

$$y(t) = h_{11} x_{TX1}(t) + \ldots + h_{1n} x_{TXn}(t) = (h_{11} w_1 * + \ldots h_{1n} w_n *) S(t) \quad (5)$$

Here, according to the embodiment of the present invention described above, it is assumed that the number of antennas in each antenna group constituting the entire antennas n is not larger than half the prescribed reference signal length, and that a reception weight vector is sufficiently converged in the radio base station system as a whole. Then, the following equation (6) is established, and a down antenna gain with respect to mobile terminal 20 is maximized.

$$(h_{11} w_1 * + \ldots + h_{1n} w_n *) = 1.0 \quad (6)$$

$$(h_{11} w_1 * + \ldots + h_{1n} w_n *) < 1.0 \quad (7)$$

A manner of convergence of transmission directivity in this example will be described with reference to FIG. 5A. Here, an arrow in FIGS. 5A and 5B indicates a direction viewing the radio base station system from the mobile terminal, while a curve intersecting the arrow indicates directivity in a down direction from the radio base station system to the mobile terminal.

In FIG. 5A, if the antenna gain in the down direction from the radio base station system attains the maximum value as shown in the above equation (6), the peak of the directivity is directed toward the mobile terminal, and the coverage of the transmission radio wave is maximized.

In contrast, if it is assumed that the reception weight vector in the radio base station system is not sufficiently converged, the above equation (7) is established, and the down antenna gain with respect to mobile terminal 20 is not maximized.

A manner of convergence of transmission directivity in this example will be described with reference to FIG. 5B. In FIG. 5B, if the down antenna gain from the radio base station system is not maximized as shown in the above equation (7), the peak of the directivity is deviated from the direction of mobile terminal, and the coverage of the transmission radio wave is not maximized, as in FIG. 5A.

Thus, according to the configuration of the embodiment of the present invention, antennas in the entire radio base station system are divided into a plurality of antenna groups each including antennas in the number that allows convergence of reception directivity using the signal length of the known reference signal. Then, the adaptive array processing is performed for each of the plurality of antenna groups, and the weight vector is converged in all antennas in the radio base station system. Thus, convergence of reception directivity can be facilitated, and the antenna gain in transmission can be increased, without expanding the known reference signal itself.

As described above, according to the present invention, antennas in the entire radio base station system are divided into a plurality of antenna groups each including antennas in the number that allows convergence of reception directivity using the signal length of the known reference signal. Then, the adaptive array processing is performed for each of the plurality of antenna groups. The array output signals obtained for the plurality of antenna groups are processed in accordance with the weight information based on accuracy of the adaptive array processings for the plurality of antenna groups, and the reception signal from the specific mobile terminal is generated. Therefore, the adaptive array processing using larger number of antennas can be achieved, without increasing the signal length of the known reference signal itself. Thus, the antenna gain can be increased, and the coverage of the transmission radio wave can be expanded, without lowering data throughput.

INDUSTRIAL APPLICABILITY

As described above, according to the radio base station system and the method of controlling directivity of the present invention, the adaptive array processing using larger number of antennas with the reference signals of the limited signal length can be achieved. Therefore, the antenna gain can be increased without lowering data throughput, which is useful in expanding coverage of the transmission radio wave in the radio base station system.

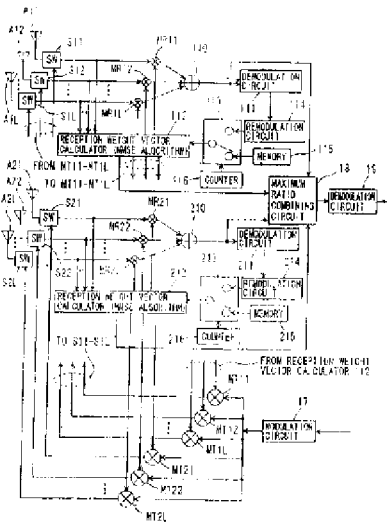

F I G. 3
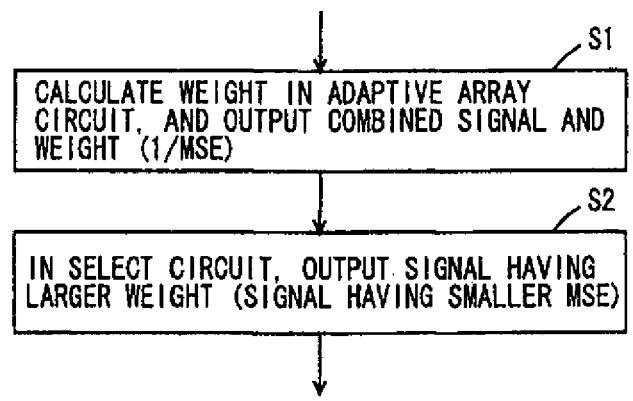

The invention claimed is:

1. A radio base station system communicating signals with a plurality of mobile terminals using a plurality of antennas (A11 to A1L, A21 to A2L), said signal being divided into signal sections including a known reference signal of a first signal length and a data signal of a second signal length, said plurality of antennas being divided into a plurality of antenna groups each including antennas in a number that allows convergence of reception directivity using the known reference signal of said first signal length, the radio base station system comprising:

a plurality of adaptive array processing portions (MR11 to MR1L, 110 to 116, MR21 to MR2L, 210 to 216) provided corresponding to said plurality of antenna groups respectively, each performing a prescribed adaptive array processing to signals received at corresponding said antenna group to extract an array output signal corresponding to a specific mobile terminal among said plurality of mobile terminals, and generating weight information based on accuracy of said adaptive array processing; and a reception signal generating portion (18, 20) receiving said array output signal and said weight information from each adaptive array processing portion and generating a reception signal from said specific mobile terminal, based on a plurality of said array output signals corresponding to said specific mobile terminal and a plurality of pieces of said weight information supplied from said plurality of adaptive array processing portions.

2. The radio base station system according to claim 1, wherein
said reception signal generating portion includes a maximum ratio combining portion (18) generating the reception signal from said specific mobile terminal by performing maximum ratio combining of the plurality of said array output signals corresponding to said specific mobile terminal and the plurality of pieces of said weight information.

3. The radio base station system according to claim 1, wherein
said reception signal generating portion includes a select portion (20) comparing the plurality of pieces of said weight information, selecting any one of the plurality of said array output signals based on that result, and outputting the signal as the reception signal from said specific mobile terminal.

4. The radio base station system according to claim 1, wherein
said weight information is based on a mean square error between said array output calculated by each of said adaptive array processing portions and said reference signal.

5. The radio base station system according to claim 1, further comprising a directivity convergence portion (MT11 to MT1L, MT21 to MT2L) converging transmission directivity of a transmission signal to said specific mobile terminal, based on results of adaptive array processings by said plurality of adaptive array processing portions.

6. The radio base station system according to claim 1, wherein
a number of antennas that allows convergence of reception directivity is not larger than half said first signal length of said reference signal.

7. A method of controlling directivity in a radio base station system communicating signals with a plurality of mobile terminals using a plurality of antennas (A11 to A1L, A21 to A2L), said signal being divided into signal sections including a known reference signal of a first signal length and a data signal of a second signal length, said method comprising the steps of:

dividing said plurality of antennas into a plurality of antenna groups each including antennas in a number that allows convergence of reception directivity using the known reference signal of said first signal length;

performing a prescribed adaptive array processing to signals received at corresponding said antenna group for each of said plurality of antenna groups to extract an array output signal corresponding to a specific mobile terminal among said plurality of mobile terminals, and generating weight information based on accuracy of said adaptive array processing; and receiving said array output signal and said weight information with respect to each of said plurality of antenna groups and generating a reception signal from said specific mobile terminal, based on a plurality of said array output signals corresponding to said specific mobile terminal and a plurality of pieces of said weight information.

8. The method according to claim 7, wherein
said step of generating said reception signal includes the step of generating the reception signal from said specific mobile terminal by performing maximum ratio combining of the plurality of said array output signals corresponding to said specific mobile terminal and the plurality of pieces of said weight information.

9. The method according to claim 7, wherein
said step of generating said reception signal includes the step of comparing the plurality of pieces of said weight information, selecting any one of the plurality of said array output signals based on that result, and outputting the signal as the reception signal from said specific mobile terminal.

10. The method according to claim 7, wherein
said weight information is based on a mean square error between said array output calculated through said prescribed adaptive array processing and said reference signal.

11. The method according to claim 7, further comprising the step of converging transmission directivity of a transmission signal to said specific mobile terminal, based on results of said adaptive array processings.

12. The method according to claim 7, wherein
a number of antennas that allows convergence of reception directivity is not larger than half said first signal length of said reference signal.

* * * * *

UNITED STATES PATENT AND TRADEMARK OFFICE
CERTIFICATE OF CORRECTION

| | | |
|---|---|---|
| PATENT NO. | : 7,403,798 B2 | Page 1 of 8 |
| APPLICATION NO. | : 10/471280 | |
| DATED | : July 22, 2008 | |
| INVENTOR(S) | : Doi | |

It is certified that error appears in the above-identified patent and that said Letters Patent is hereby corrected as shown below:

Title page illustrating a figure(s) should be deleted, and replaced with title page illustrating a figure(s). (attached)

Delete drawing sheets 1-5, and replace with drawing sheets 1-6. (attached)

Signed and Sealed this

Twenty-eighth Day of April, 2009

JOHN DOLL
*Acting Director of the United States Patent and Trademark Office*

United States Patent
Doi

(10) Patent No.: US 7,403,798 B2
(45) Date of Patent: Jul. 22, 2008

(54) WIRELESS BASE SYSTEM, AND DIRECTIVITY CONTROL METHOD

(75) Inventor: Yoshiharu Doi, Gifu (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 399 days.

(21) Appl. No.: 10/471,280

(22) PCT Filed: Aug. 13, 2001

(86) PCT No.: PCT/JP01/06991

§ 371 (c)(1),
(2), (4) Date: Sep. 17, 2003

(87) PCT Pub. No.: WO02/075957

PCT Pub. Date: Sep. 26, 2002

(65) Prior Publication Data

US 2004/0110538 A1 Jun. 10, 2004

(30) Foreign Application Priority Data

Mar. 21, 2001 (JP) ............................ 2001-080423

(51) Int. Cl.
*H04M 1/00* (2006.01)
*H04B 1/06* (2006.01)
*H04B 7/00* (2006.01)

(52) U.S. Cl. ............... 455/561; 455/562.1; 455/272; 455/273; 455/101; 455/137

(58) Field of Classification Search ............ 455/561, 455/562.1, 273, 101, 137, 278.1, 269, 272
See application file for complete search history.

(56) References Cited

U.S. PATENT DOCUMENTS

| 5,752,173 | A | * | 5/1998 | Tsujimoto | 455/137 |
| 6,061,553 | A | * | 5/2000 | Matsuoka et al. | 455/273 |
| 6,347,234 | B1 | * | 2/2002 | Scherzer | 455/562.1 |

(Continued)

FOREIGN PATENT DOCUMENTS

EP    0 984 507 A2    3/2000

(Continued)

OTHER PUBLICATIONS

Nobuyoshi Kikuma, Kagaku Gijutsu Shuppan, pp. 35-49, Nov. 1998, "*Adaptive Signal Processing by Array Antenna*" together with Partial English Translation.

(Continued)

*Primary Examiner*—Matthew Anderson
*Assistant Examiner*—Wen W Huang
(74) *Attorney, Agent, or Firm*—Westerman, Hattori, Daniels & Adrian, LLP.

(57) ABSTRACT

Antennas in an entire radio base station system are divided into two antenna groups so that each group has antennas in the number that allows convergence of reception directivity using a reference signal length. Reception weight vector calculators (112, 212) corresponding to respective antenna groups perform adaptive array processings, and corresponding array outputs are provided to a maximum ratio combining circuit (18). The maximum ratio combining circuit (18) performs maximum ratio combining of the array outputs corresponding to two antenna groups, based on weight information output from the reception weight vector calculators (112, 212).

12 claims, 6 Drawing Sheets